United States Patent
Miller et al.

(10) Patent No.: US 12,556,557 B2
(45) Date of Patent: Feb. 17, 2026

(54) SECURITY EVENT MANAGEMENT SYSTEM AND ASSOCIATED METHOD

(71) Applicant: KPMG LLP, New York, NY (US)

(72) Inventors: Matthew Peyton Miller, New York, NY (US); Dennis Helmut Stammel, Austin, TX (US); Chadd Daniel Carr, Gainesville, VA (US); Amod Prasad Acharya, Queens, NY (US); Ryan Weslee Budnik, Austin, TX (US); James E. Collinge, Austin, TX (US); Noah-Raine G. De Joya, Acworth, GA (US); James Leach, New York, NY (US); Christopher P. Macon, San Francisco, CA (US); Conor Doherty, Grand Rapids, MI (US)

(73) Assignee: KPMG LLP, New York, NY (US)

( * ) Notice: Subject to any disclaimer, the term of this patent is extended or adjusted under 35 U.S.C. 154(b) by 153 days.

(21) Appl. No.: 18/329,299

(22) Filed: Jun. 5, 2023

(65) Prior Publication Data
US 2023/0396640 A1    Dec. 7, 2023

Related U.S. Application Data

(60) Provisional application No. 63/348,680, filed on Jun. 3, 2022.

(51) Int. Cl.
  *H04L 9/40* (2022.01)
  *G06Q 30/0283* (2023.01)

(52) U.S. Cl.
  CPC ..... *H04L 63/1425* (2013.01); *G06Q 30/0283* (2013.01)

(58) Field of Classification Search
  CPC .................. H04L 63/1425; G06Q 30/0283
  See application file for complete search history.

(56) References Cited

U.S. PATENT DOCUMENTS

| | | | |
|---|---|---|---|
| 2018/0234310 A1* | 8/2018 | Ingalls | H04L 43/045 |
| 2019/0260789 A1* | 8/2019 | Hagi | G06N 3/049 |
| 2020/0177617 A1* | 6/2020 | Hadar | G06F 21/552 |
| 2021/0037029 A1* | 2/2021 | Hassanzadeh | G06N 7/01 |

* cited by examiner

*Primary Examiner* — Joe Chacko
(74) *Attorney, Agent, or Firm* — Nelson Mullins Riley & Scarborough LLP; Anthony A. Laurentano

(57) ABSTRACT

A network security monitoring system having a plurality of data sources for providing security data, an extraction unit for extracting the security data from the sources of the security data to form extracted security data, a graphing unit for mapping the extracted security data to at least one or more data fields and data models to form graph data, and a data lineage determination unit for determining a data lineage between the log data and one or more of the alerts based on the graph data.

26 Claims, 9 Drawing Sheets

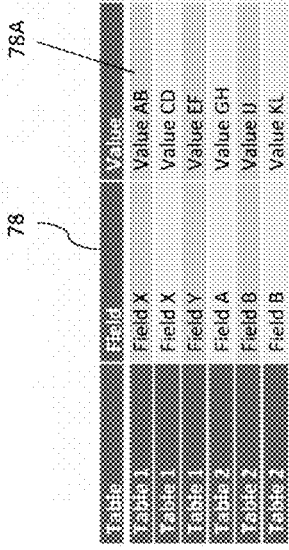
FIG. 4A
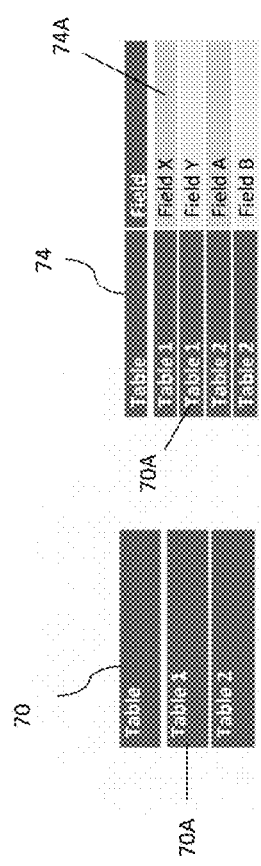
FIG. 4B
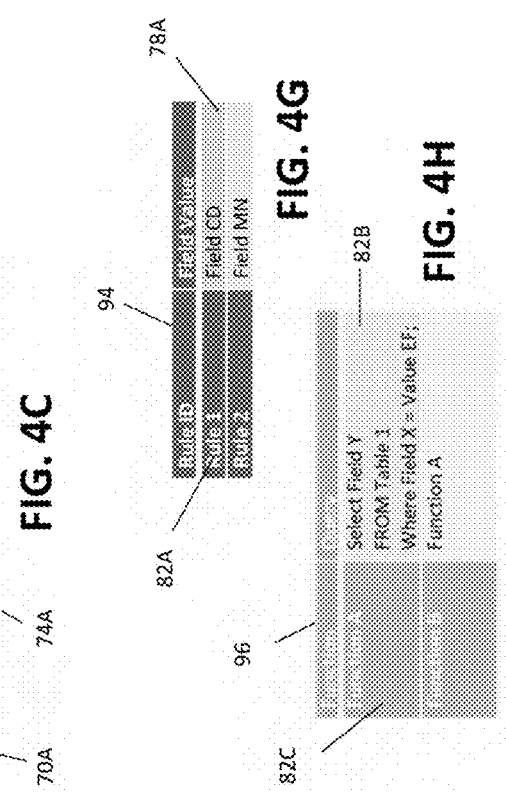
FIG. 4C
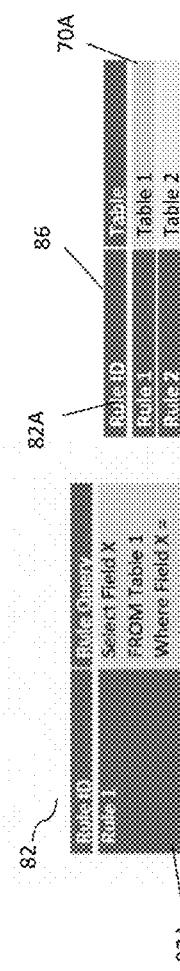
FIG. 4D
FIG. 4E
FIG. 4F
FIG. 4G
FIG. 4H

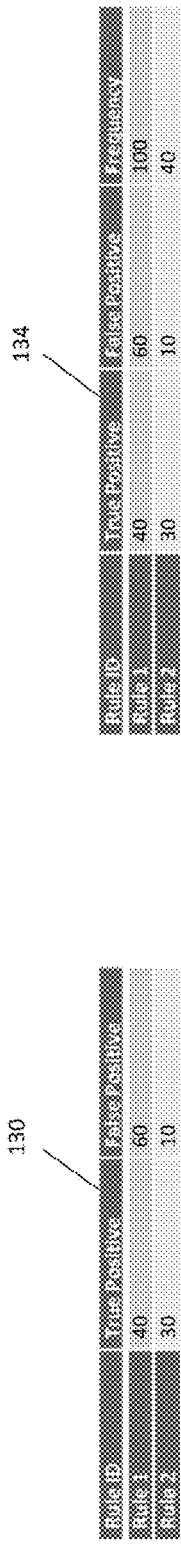
FIG. 7A
FIG. 7B
FIG. 7C
FIG. 7D
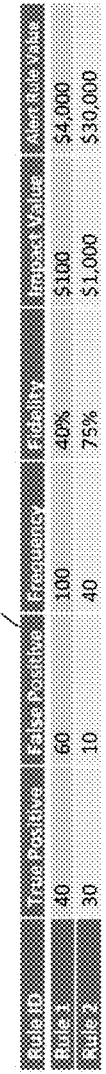
FIG. 7E

SECURITY EVENT MANAGEMENT SYSTEM AND ASSOCIATED METHOD

CROSS-REFERENCE TO RELATED APPLICATIONS

This Application claims the benefit of U.S. Provisional Application 63/348,680 filed on Jun. 3, 2022. The entire contents of the prior application is incorporated herein by reference in its entirety.

BACKGROUND OF THE INVENTION

The present invention is generally related to cyber security threats to enterprise and personal computer systems, and more particularly relates to systems and methods for monitoring and mitigating cyber security threats and cyber risks to corporate and employee computer systems.

With the ever increasing levels of personal and corporate dependence on information systems, including for example Information Technology (IT) systems, Internet of Things (IoT) and Operational Technology (OT) systems, and their ubiquitous interconnection to the Internet, there has unfortunately been a significant rise in the amount and range of malicious attacks (cyber threats or cyber-attacks) by hackers or the like, operating in 'cyber space,' to attack or undermine the operations of the IT systems. That is, cyber-attacks are more frequent than ever before due to the ever increasing availability of internet connectivity across all types of devices from laptops, desktops, notepads, mobile phones and the broad spectrum of everyday devices that are connected to the Internet (e.g., Internet-of-Things or IoT) and are significantly affecting businesses and individual's productivity and monetary interests. The cyber-attacks normally target vulnerabilities in the IT systems to steal confidential information, and can take many forms including Phishing attacks, distributed denial-of-service attacks, account takeover attempts, ransomware attacks, and other known malicious types of activity, and have come to dominate the everyday operations of organizations, thereby requiring significant labor force and enterprise attention and resources. Additionally, the cyber-attacks can target individual employees through sophisticated social engineering personalized attacks. These collectively have become known as cyber-crimes.

Cyber-crimes have become one of the world's major problems with new breaches of data and releases of ransomware occurring hourly at an alarming rate. Cyber-crimes cost many businesses billions of dollars every year. Any person or business regardless of size is potentially vulnerable to cyber risks, from some of the world's largest corporations, to critical national infrastructure, to small local enterprises, and to individuals. These types of cyber-crimes will continue to increase, particularly as evolving programs such as Internet of Things (IoT), smart cities, and mass digitization become the reality of daily life. Further, the cost of preventing and responding to cyber-crimes will continue to grow exponentially causing serious financial and reputational damage to individuals and businesses.

In order to properly address these cyber security threats, a significant cyber security infrastructure and related personnel needs to be deployed and maintained. The security infrastructure can include employing a number of different security tool software applications as well as associated hardware devices, all maintained by the technical personnel. As the cyber threats increase in size and scale, and become more sophisticated, businesses and the employees who manage the security infrastructure have needed to adapt. This adaptation requires new skills, new tools, new processes, policies and enterprise-level training.

Many logs within an organization contain records related to computer security. These computer security logs are generated by many sources, including security software, such as antivirus software, firewalls, and intrusion detection and prevention systems, network monitoring software, operating systems on servers, workstations, networking equipment, applications, routers, switches, wireless access points, cell phones, laptops, and the like. A security log is a record of events occurring within an organization's systems and networks. The logs are composed of log entries, where each entry can include information related to a specific event that has occurred within a system or network. Originally, logs were used primarily for troubleshooting problems, but logs now serve many functions within most organizations, such as optimizing system and network performance, recording the actions of users, and providing data useful for investigating malicious activity. The security logs have also evolved over time to include information related to many different types of events occurring within networks and systems. Within an organization, many logs contain records related to computer security. Common examples of these computer security logs are audit logs that track user authentication attempts and security device logs that record possible attacks.

Because of the widespread deployment of networked servers, workstations, and other computing devices, and the ever-increasing number of threats against networks and systems, the number, volume, and variety of computer security logs has increased greatly. This has created the need for computer security log management, which is the process for generating, transmitting, storing, analyzing, and disposing of computer security log data.

Today, enterprises spend increasingly large amounts of money to collate and analyze security data, such as ingesting logs into known security software, e.g., security information event management (SIEM) software, for correlating, detecting and then responding to security threats. Further, third party software companies change the enterprises upon log ingest regardless of whether the logs are used for valuable alerting or not.

SUMMARY OF THE INVENTION

The present invention is directed to a security event management system and associated method for aggregating network security data and for extracting selected types of security data therefrom, and then for selectively processing the security data in order to determine a lineage of the security data, such as from log data source to alerts. The security event management system of the present invention can also employ a cost estimation unit for selectively determining a cost associated with monitoring or processing certain types of security data, such as alerts.

The present invention is directed to a computer-implemented network security monitoring system that comprises a plurality of data sources for providing security data, wherein the security data includes log data, event data, alert data, and alert rules data; an extraction unit for extracting the security data from the sources of the security data to form extracted security data; a graphing unit for mapping the extracted security data to at least one or more data fields and data models to form graph data; and a data lineage determination unit for determining a data lineage between the log data and one or more of the alerts based on the graph data.

The network security monitoring system can further include a query unit for communicating with the graphing unit such that at least one system query can be generated and for querying the graph data generated by the graphing unit, and a cost estimation unit for determining a cost value associated with one or more types of the security data based on one or more selected types of cost data and the graph data. The cost estimation unit can determine the cost value associated with monitoring the alert data.

The data lineage determination unit is configured to map the log data to the event data, and then to map the event data to one or data fields. The data lineage determination unit can also be optionally configured to map the one or more data fields to one or more data models. The data lineage determination unit can be further optionally configured to map the one or more data models to one or more alert rules, and then to map the one or more alert rules to one or more alerts. The cost estimation unit can be configured to determine a selected cost value of the alert rule. The cost estimation unit can also be configured to determine a selected cost value associated with each of the sources of the log data.

The graph data can include three or more of a first data table identifying a first plurality of tables, a second data table associating a plurality of data fields with the first plurality of tables from the first data table, a third data table correlating the first plurality of tables and the plurality of data fields with a plurality of data field values associated with each of the plurality of data fields, a fourth table that lists a plurality of alert rules with a plurality of query results or a plurality of functions, a fifth table that correlates the plurality of alert rules with the first plurality of tables, a sixth table that correlates the plurality of alert rules with the plurality of data fields, a seventh table that correlates the plurality of alert rules with the plurality of data field values, and an eight table that correlates the plurality of query results with the plurality of functions. The first plurality of tables can represent a location of the log data. The third table can include a summary of count (n) per field values associated with the plurality of data field values.

According to another aspect, the graph data can include a first data table identifying a first plurality of tables, a second data table associating a plurality of data fields with the first plurality of tables from the first data table, a third data table correlating the first plurality of tables from the first data table and the plurality of data fields from the second table data with a plurality of data field values associated with each of the plurality of data fields, a fourth table that lists a plurality of alert rules with a plurality of query results or a plurality of functions, and a fifth table that correlates the plurality of alert rules with the first plurality of tables. The data lineage determination unit can determine a lineage between one or more of the first plurality of tables and one or more of the plurality of alert rules from the graph data. The graph data can also optionally include a data table having selected alert rules associated therewith, and the cost estimation unit can be configured to determine a frequency of one or more alerts based on the alert rules and to update the data table to include the frequency of the alerts and to determine the cost value associated with the alerts. The cost estimation unit can also determine an impact value for one or more of the alert rules.

The present invention is also directed to a computer-implemented method for determining a data lineage comprising receiving security data from a plurality of data sources, wherein the security data includes log data, event data, alert data, and alert rules data; extracting the security data from the plurality of data sources with an extraction unit to form extracted security data; mapping the extracted security data to at least one or more data fields and data models with a graphing unit to form graph data; and determining a data lineage between the log data and one or more of the alerts based on the graph data with a data lineage determination unit.

The method can also include communicating with the graphing unit via a query unit such that at least one system query can be generated and for querying the graph data generated by the graphing unit. The method can also determine a cost value associated with one or more types of the security data with a cost estimation unit based on one or more selected types of cost data and the graph data. The cost estimation unit can also determine the cost value associated with monitoring the alert data.

The method of the present invention can also map the log data to the event data and the event data to one or more data fields with the data lineage determination unit. The data lineage determination unit can also be configured to map the one or more data fields to one or more data models, and optionally the one or more data models to one or more alert rules and the one or more alert rules to one or more alerts. The cost estimation unit can determine a selected cost value of the alert rule with the cost estimation unit or with each of the sources of the log data.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

FIGS. 4A-4H are data tables showing the log data sources, fields, field values, and security alerts and associated security rules, employed by the data lineage determination unit of the security event management system of the present invention.

FIGS. 7A-7E are data tables employed by the cost estimation unit to determine a value associated with each alert according to the teachings of the present invention.

DETAILED DESCRIPTION

Figure 1:
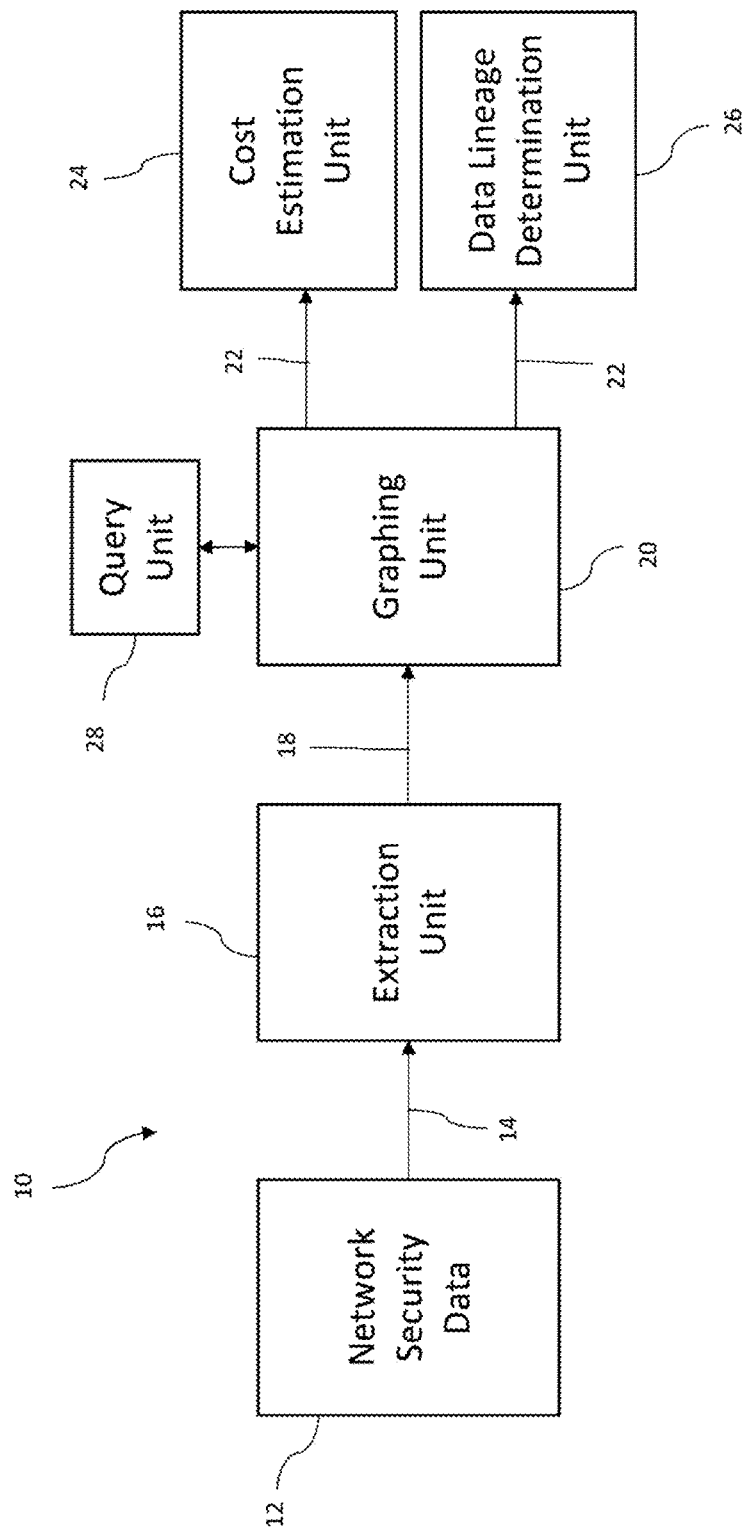
FIG. 1 is a schematic block diagram illustrating the security event management system of the present invention.

As used herein, the term "enterprise" is intended to include all or a portion of a company, a structure or a collection of structures, facility, business, company, firm, venture, joint venture, partnership, operation, organization, concern, establishment, consortium, cooperative, franchise, or group or any size. Further, the term is intended to include an individual or group of individuals, or a device or equipment of any type.

As used herein, the term "data lineage" refers to the record or lineage of the origin, transformations, movements, and destinations of data, such as security data, as the data flows through various systems, processes, and transformations within an enterprise. The lineage tracks and documents all or a portion of the lifecycle of the data, thus providing a historical data trail that shows how data has been sourced, modified, integrated, and used within the data ecosystem of the enterprise. The lineage of the data helps establish data provenance, helps understand data quality, helps facilitate data governance, supports compliance requirements, and enhances data transparency and overall trust in the data. By tracing the lineage of data, the enterprise can gain insights into the origins, transformations, and dependencies of the data, enabling the enterprise to make informed decisions about data usage, reliability, and compliance. The data lineage can include information such as data sources (e.g., the systems, applications, databases, or files from which the data originates), data transformations (e.g., the operations, processes, or transformations applied to the data, such as aggregation, filtering, cleansing, and enrichment), data movement (e.g., the paths and channels through which the data is transferred or exchanged between systems, databases, or applications), data storage (e.g., the locations and repositories where the data is stored, including data warehouses, data lakes, databases, and file systems), data consumers (e.g., the systems, reports, applications, or users that utilize or consume the data for various purposes, such as analytics, reporting, or decision-making), and data attributes (e.g., the characteristics and metadata associated with the data, including data types, formats, structures, and business rules). The data lineage can be established and maintained through various mechanisms, including metadata management tools, data integration platforms, data cataloging solutions, and data governance frameworks. The system of the present invention can determine the data lineage to help organizations understand the flow and transformations applied to data, identify data dependencies, assess the impact of changes, troubleshoot data issues, ensure regulatory compliance, and maintain data integrity and quality throughout the lifecycle of the data.

As used herein, the term "network security data" refers to security data generated and collected from various network security systems, devices, and protocols associated with an enterprise that are designed to protect computer networks from unauthorized access, attacks, and breaches. The security data encompasses a wide range of data types, including data and security logs, data and security event records, network traffic captures, alerts, and system-generated reports. The network security data can be obtained or retrieved from various data sources, such as firewalls, intrusion detection and prevention systems (IDPS), antivirus software, network monitoring tools, security information and event management (SIEM) systems, and other network security appliances. The data provides insights into the state of network security, potential vulnerabilities, and ongoing security incidents. The ability to analyze network security data helps to identify and mitigate security threats, detect suspicious activities, investigate security incidents, and ensures the overall security posture of the network. The network security analysis and monitoring can involve monitoring and analyzing network traffic patterns, examining log files for signs of intrusion or unauthorized access, and correlating data from different security devices to gain a comprehensive understanding of the network's security status. This understanding allows enterprises to proactively respond to potential security breaches, prevent data loss or theft, and ensure the confidentiality, integrity, and availability of network resources.

As used herein, the term "security data" refers to data or information that is collected, generated, or processed in the context of security operations, risk management, and threat analysis associated with an enterprise. The data can encompass a wide range and variety of data types that are relevant to ensuring the confidentiality, integrity, and availability of assets, as well as protecting against unauthorized access, vulnerabilities, and security breaches to the network. The data can include alerts, alert rules or correlations, logs including security logs, event data or records, system and network logs, vulnerability assessments, security incident reports ad related incidents, threat intelligence feeds, user access logs, authentication and authorization records, and security configuration data, network traffic data, intrusion detection/prevention system alerts, security incident response data, compliance audit logs, malware analysis data, physical security data, security awareness training data, and the like. The data can also include data collected from security devices and tools such as firewalls, intrusion detection and prevention systems, antivirus software, security information and event management systems, and other security appliances, tools, and systems. The event data or records can include detailed information about specific security events, such as login attempts, authentication failures, file modifications, network connections, and system crashes. The vulnerability assessments can include data collected from vulnerability scans and assessments that identify weaknesses and vulnerabilities in systems, applications, and network infrastructure. The security incident reports can include data and documentation of security incidents, including their nature, impact, investigation findings, containment measures, and remediation steps. The threat intelligence feeds can include external data sources that provide information about known threats, malicious actors, emerging vulnerabilities, and indicators of compromise (IOCs). The user access logs can include data or records of user activities, login attempts, privilege escalations, and changes in user permissions and access rights. The authentication and authorization records can include information related to user authentication, including login timestamps, authentication methods used, and access control decisions. The security configuration data can include information about the security settings, configurations, and policies implemented in systems, devices, and applications. The network traffic data can include captured network packets or flow data that reveal communication patterns, source and destination IP addresses, ports, protocols, and potential anomalies or malicious activities. The intrusion detection/prevention system alerts can include notifications and alerts triggered by IDP S systems when detecting suspicious or malicious activities, such as network intrusions or attempted exploits. The security incident response data can include data that is collected during security incident response activities, including incident tickets, incident handling notes, and post-incident analysis reports. The compliance audit logs can include data or records of activities and events that demonstrate adherence to security policies, regulations, and industry standards. The malware analysis data can include information obtained from analyzing malware samples, including their behavior, signatures, indicators, and mitigation techniques. The physical security data can include data collected from surveillance systems, access control systems, and other physical security measures, such as video recordings, access logs, and alarms. The security awareness training data can include metrics and records related to security awareness training programs, including participant progress, quiz scores, and completion rates. The security data can provide insights into the network security posture of the enterprise, identify potential security threats and vulnerabilities, and facilitate effective security incident detection, response, and mitigation. By analyzing security data, the system of the present invention can monitor and detect anomalous activities, investigate security incidents, conduct risk assessments, implement security controls, and make informed decisions to enhance the overall security of an enterprise.

As used herein, the term "alert rule" refers to predefined conditions or data patterns that are configured to detect and to trigger alerts when specific security events or anomalies occur within the network. The rules can be configured to monitor network traffic, system logs, and other relevant security data sources in real-time or near-real-time. The alert rules can include specific events, behaviors, thresholds, or patterns that indicate potential security threats or violations, and can be created based on known attack signatures, abnormal behavior baselines, statistical anomalies, or other indicators of malicious activity. When an alert rule is triggered, the rule generates an alert or notification, which can be sent to security administrators, network operators, or the SIEM system. The purpose of the alert rules is to promptly identify and respond to potential security incidents, allowing the system to initiate appropriate actions to mitigate the security threats and to prevent further damage or unauthorized access to the system.

As used herein, the term "data model" can be an abstract model that represents source data objects, data flow between the data objects, and the interrelationship between the data objects as data elements and organizes the data elements and standardizes how the data elements relate to each other. The data model is in essence a way of storing source data so that the source data can be used in a more efficient manner for further purposes. The data model can include a set of standardized, extensible data schemas that employ a defined set of data entities, data attributes, relationships, and semantic metadata (i.e., traits). The data entity can describe the structural shape and semantic meaning for records of the data. The data entities can thus represent physical objects, locations, interactions, individuals, point-in-time measurements, data types, and the like. The data entity can also describe the meaning and shape of the data through a set of attributes, which can include an atomic or simple attribute type and a more complex, composite attribute type. The data model allows downstream applications to be able to use the data stored therein by providing a normalized, standardized, and shared data language for the applications to use. The data model can have a data structure that includes a data object. According to one embodiment, the data model can include a common data model that allows for the placing of data into a uniform structure that has a defined set of attributes and entities. The common data model can serve to conform, organize, and normalize elements of data and standardize or normalize how the data elements relate to one another and to the properties of real-world entities.

As used herein, the term "data field" is intended to refer to a specific unit of data that holds or contains information about a particular attribute or characteristic of a data entity. The data field can represent a discrete piece of data within a record or data structure (e.g., tables, arrays, queues, and the like) and is used to store and organize data in a structured manner. The data fields can be, for example, defined and structured within a data schema or data model, specifying the data type, size, format, and any associated constraints or validation rules. The fields can store various types of data, including numbers, text, dates, binary data, or more complex data structures like arrays or objects, depending on the specific data field type. In a database, the data fields can correspond to columns in a table and each record or row in the table can include values for each data field. For example, in a customer database, a data field could represent attributes such as "customer name," "address," "phone number," or "email." Each of these fields can hold the respective data for individual customers. The data fields provide a way to organize and categorize information within a data structure, enabling efficient storage, retrieval, and manipulation of data. The fields also allow for standardized data representation, consistency, and enforces data integrity by enforcing rules such as data type constraints, minimum and maximum values, or data format requirements.

The security event management system of the present invention, which can be implemented as part of an overall security information and incident event management (SIEM) system, initially ingests and aggregates large volumes of security data, such as log data, then associated systems can run selected analytics on the log data to trigger security alerts when certain security criteria are met. The criteria are defined by alert rules. The ingestion of large amounts of data can become expensive and it is difficult to understand or determine the security value that comes from security data from each data source in the form of downstream alerts. The present invention is directed to a security event management system for automatically tracking a data lineage from security log events to high-value alerts based on log value and other types of data. Specifically, the security event management system of the present invention can establish a log data lineage that can trace alert logic back to contributing logs and fields. The present invention can connect alert data to log source data to understand the relationship therebetween in a way that allows high-value and low-value data sources to be identified. This allows a user to determine which data source should be kept and acted upon and which data sources can potentially be decommissioned or ignored to save money.

The security event management system 10 of the present is shown for example in FIG. 1. The system enables a system user to determine a lineage, such as a data lineage, between a log source and a system alert. The system can form part of a SIEM system or solution, and the lineages can be used to calculate or determine a return on investment (ROI) per data source at various levels of granularity. For example, the ROI calculation can include data lineage per data source, logging cost per data source, and rule alert value per data source.

The illustrated security event management system 10 includes one or more network security data sources 12 for providing various types of network security data to the system for further processing. The network security data can include, for example, security data that includes log data, incident data, alert data and associated alert rules data. The log data can include security logs that are generated by many different sources, including security software, such as anti-virus software, firewalls, and intrusion detection and prevention systems, and by network monitoring software, operating systems on servers, workstations, networking equipment, applications, routers, switches, firewalls, wireless access points, cell phones, laptops, and the like. As used herein, the term "log" or "log data" or "security log" is intended to include data associated with a record of events, activities, and incidents captured by various systems, devices, and applications occurring within the security systems and networks of the enterprise. Examples include system logs, network logs, access logs, and audit logs. The logs can include log entries, where each entry can include information related to a specific security event that has occurred within a system or network. The logs can be employed to optimize system and network performance, record the actions of users, and provide data useful for investigating malicious activity, such as cyber activity. The log data can be employed by the system to determine or derive ingestion volume per table and/or data source, derive data schemas per table, and derive field values per table. An event is an observed change to the normal behavior of a system, environment, process, workflow, or person.

The incident data can include any type or kind of data associated with a security incident or event that is related to a security threat to the system or negatively affects the confidentiality, integrity, and/or availability (CIA) at an enterprise in a way that impacts the business. The security incident or event can be anything from an active threat to the system, an attempted intrusion into the system, or a successful system or data compromise or data breach. Specifically, the incident data can include the attempted or successful unauthorized access, use, disclosure, modification, or destruction of information in an information system or with system operations in an information system. The incident data can be used to derive frequency per alert, derive fidelity per alert, or derive severity and/or impact cost per alert rules.

The alert rules data correspond to the use of one or more rules that can be employed to generate, identify and optionally modify system or security alerts as they arise or are identified in the system. The alert rules can be employed to add action groups or remove or suppress action groups from the alerts. The alerts correspond to an indication or notification that a selected event or series of events has occurred, and which is then sent to responsible parties for the purpose of spawning action. The alert rules can be employed to parse rule query/logic for SIEM tables generated by the system, parse fields and field values, determine lookback periods for incident and log data, and use rule identification (ID) and/or name as a unique rule identifier for the security data.

The security data 14 from the security data sources 12 can be ingested, aggregated and stored in an extraction unit 16. The extraction unit 16 can employ an extract, load and transform (ETL) process or technique on the security data 14. The ETL process can be configured to extract selected types of security data 14 from the data sources 12, to clean and transform the data 14 so that the data is placed in a more standardized or normalized format, and then load the normalized security data into a data storage facility, such as a storage element. The normalized security data 18 is then conveyed to a graphing unit 20 for graphing, matching or mapping the data to selected data fields and/or data models. The graphing unit 20, in conjunction with a data lineage determination unit 26, can help create a lineage between selected data elements, such as for example between sources of security data, logs, alerts, and alert rules, in the form of nodes and edges in a graph. The data element can be a unit of data that represents a single attribute or characteristic of a data entity. The data element can include a name or identifier and a specific data type that determines the kind of information retained by the data element. A query unit 28 can be provided that communicates with the graphing unit 20 in order to allow a user to generate one or more system queries, such as for example by querying the data stored in the graphing unit 20.

The graph data 22 generated by the graphing unit 20, and resident within the data models or data fields, can be optionally conveyed to and processed by a cost estimation unit 24. The illustrated cost estimation unit 24 can determine a cost or cost value associated with one or more aspects of the security data 14 based on the graph data 22 and any preselected or provided cost data. For example, the cost estimation unit 24 can include or receive cost data associated with ingesting, storing and processing one or more types of security data. Based on the pre-stored data, the cost estimation unit 24 can determine the costs associated with one or more alerts or log sources. For example, the cost estimation unit can generate, and the user can assess, the cost and associated value of the alerts as well as the network or system logs. The cost data can include the costs that a user of the system is charged for receiving, aggregating, and processing various types of alerts. The cost estimation unit 24 can be configured to determine and to quantify the costs associated with one or more types of alerts, such that the system user can determine whether it is cost effective to aggregate, track and/or act upon specific types of alerts. The data lineage determination unit 26 can be configured to receive the graph data 22 and then process the graph data 22 to determine the data lineage of selected types of security data, such as log sources and alerts.

Figure 2:
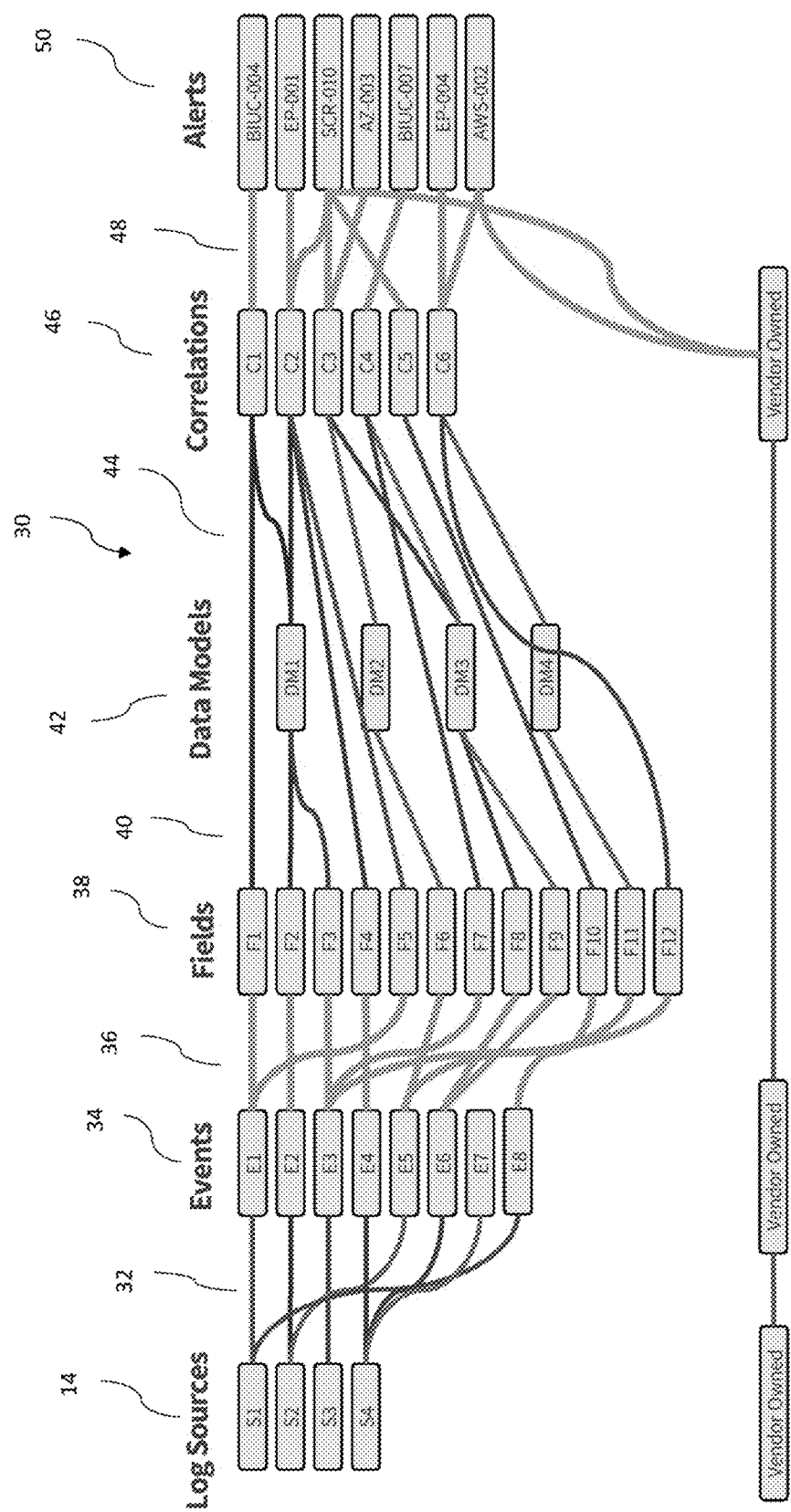
FIG. 2 is an illustrative schematic representation of a data lineage graph between log data and alert data according to the teachings of the present invention.

FIG. 2 is a representation of a graph 30 having data flows and associated data connections as determined and generated by the graphing unit 20, according to the teachings of the present invention. According to one embodiment, the graph 30 can represent a mapping of security data that can include log data 14 that is aggregated and processed by the system, such as by the extraction unit 16 and the graphing unit 20. The log data 14 can include or be associated with event data 34 that corresponds to one or more security events. The event data 34 can be representative of a change in the behavior of the system. The log data 14 and the associated log data sources can be mapped or graphed to the events data 34 by a series of logical connections 32 by the graphing unit 20. The logical connections are the edges in a graph database that allow the system to trace or track a relationship between data tables, log data sources, data fields, rules and alerts, and the like. The graphing unit 20 can employ a computer script that can be used to parse and transform the various datasets associated with the data tables and data fields into formats that allow the system to create the logical connections 32 (e.g., graph edges) in a structured way. The computer script is a set of instructions or commands written in a specific programming or scripting language that is executed by a computer or interpreter to perform a particular task or to automate a sequence of actions. The scripts are typically used to automate repetitive tasks, manipulate data, control software or hardware components, or interact with operating systems and applications. The scripts can be composed of statements and expressions that define the desired actions to be performed, and can include variables, control structures (such as loops and conditionals), functions or procedures, and other programming constructs. The scripting language used to write scripts can vary depending on the purpose and platform, and include languages such as JavaScript, Python, PowerShell, Bash, or Ruby. The event data 34 can then be graphed or mapped to selected data fields 38 via the data connections 36. Likewise, the data in the fields 38 are mapped to one or more data models 42 via the data connections 40. The data in the data models 42 can be mapped to a series of correlations or alert rules 46 by the connections 44. The correlation or alert rules can be a query that, when conditions of the query are met, the alert rule creates an alert (e.g., ticket) that the system or a system analyst can then investigate. The correlations or alert rules 46 can then be mapped to a series of security alerts 50 by a series of data connections 48. The illustrated data flow and associated data connections forming the graph can form part of the graph data 22.

Figure 3:
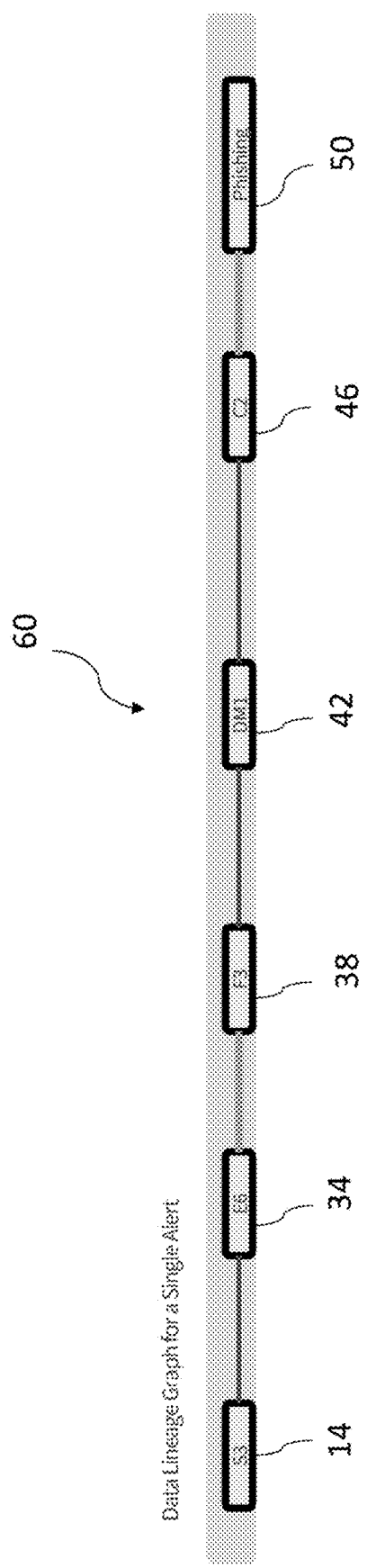
FIG. 3 is another illustrative example of a data lineage graph between log data and alert data according to the teachings of the present invention.

As shown for example in FIG. 3, the data lineage determination unit 26 can generate a data lineage graph 60 from the graph data 22 that maps the connections from the source of the input log data to the generated security alerts at the output. In the current example, the input log source 14 forming part of the input security data, such as the log source S3, is connected or mapped to a specific event 34, such as the event E6. The event is then connected or mapped to the data field F3, which in turn is connected or mapped to the data model DM1. In turn, the data model DM1 is connected or mapped to the correlation or alert rule C2, which is then mapped to a specific alert 50. The alert 50 can be any selected type of alert, such as an alert associated with phishing.

A more detailed example of the graph data 22 processed by the data lineage determination unit 26 to determine the data lineage between selected types of security data, such as log data and alert data is shown, for example, in FIGS. 4A-4H. As shown in FIG. 4A, a system user via the query unit 28 can optionally submit a request for a list of distinct table names (e.g., data field) that is set forth in a data table 70 from a database of the graphing unit 20. The table names can be representative of the input security data, such as log data 14, that can serve as root tables or sources of the log data. According to one example, the data table 70 can set forth therein selected locations of the log data, such as in Table 1 and Table 2. The query unit 28 can then optionally query the graphing unit 20 for one or more data schemas or list of distinct fields and associated names that are connected or related to the table data 70A (e.g., log data) in the table 70. As shown for example in FIG. 4B, the illustrated table 74 can include selected information, such as by listing the tables 70A from table 70 and correlating the tables 70A with data fields A, B, X, and Y 74A that are associated with the log data (e.g., tables 70A) in the table 70. The graphing unit 20 can be also be optionally queried by the query unit 28 to determine the distinct values 78A associated with each data field 74A and tables 70A. For example, as shown in FIG. 4C, the query unit 28 can retrieve a data table 78 that includes, in addition to the table information 70A and the data field information 74A, the data field values 78A associated with each of the data fields 74A. The data field values 78A can include the contents of the associated field cell in a table. The table 78 can also include a summary of count (n) per field value 78B.

The graphing unit 20 can be further optionally queried by the query unit 28 to retrieve a list of alert rules (e.g., correlations) and associated identification information, such as names and data location, corresponding to the rule query. As shown for example in FIG. 4D, the graphing unit generates a table 82 that lists the alert rules 82A and associated query results 82B or functions 82C.

The security event management system 10, via the data lineage determination unit 26 or from the query unit 28, can then optionally run a script to search each alert rule 82A in the data table 82 for strings or data connections that match selected table names from the tables list 70A associated with table 70, such that each alert rule 82A is compared to each table name 70A. For example, the script can test or determine whether a rule query contains the selected table name 70A. When a match is found, each matching alert rule ID/name 82A and table names 70A are set forth in a list. As shown for example in FIG. 4E, the search result is a data table 86 that correlates the alert rules 82A with specific table names 70A. In some cases, the alert rule 82A can reference or programmatically call a function name 82C instead of, or in addition to, a table name, as shown for example in the table 96 of FIG. 4H. The illustrated table 96 can correlate the function names 82C with the query results 82B. The function name 82C can then execute a saved query (i.e. a subquery or a query within a query). The saved query can then reference a selected table name (e.g., Table 1 from table 70), or the query can reference another function name, which executes another or different saved query. As such, the saved and correlated functions and queries can be nested within an arbitrary number of layers or steps, but eventually the graphing unit 20 can reference a "root table" (from table 70). As such, the graphing unit 20 can provide a series of data tables 70A forming part of the graph data 22 that can be processed by the data lineage determination unit 26 to establish a link or lineage between selected types of security data, such as between an alert rule 50 and the root table or log data source 14, even in the case where one or more functions are called. As such, the script can be modified to search each rule query for matching function names in addition to table names. When a function name is identified by the script, the same step/search is then repeated for the saved query of each matching function name, as set forth in table 96. The search can be repeated until no more function names are discovered, leaving only table name matches (i.e., the root tables).

Further, the graphing unit 20 can further optionally run an optional script to search each alert rule query for strings or information that match data field names from the fields list, such that each alert rule query is compared against each data field name. Specifically, the script can test whether the rule query contains a field name. When a match is found, each matching rule ID/name and field name are set forth in a list. As shown for example in FIG. 4F, the table 90 can be generated by the graphing unit 20 and can list and correlate the alert rules 82A with the data field names 74A.

Still further, the graphing unit 20 can also optionally run a script to search each alert rule query for strings or information that match data field values from the values list of other tables, such that each alert rule query is compared against each data field value. Specifically, the script can test whether an alert rule query includes a field value. When a match is found, each matching rule ID/name and field value is set forth in a list. As shown for example in FIG. 4G, the graphing unit 20 can generate a table 94 that correlates the alert rules 82A with the data field values 78A.

Figure 5:
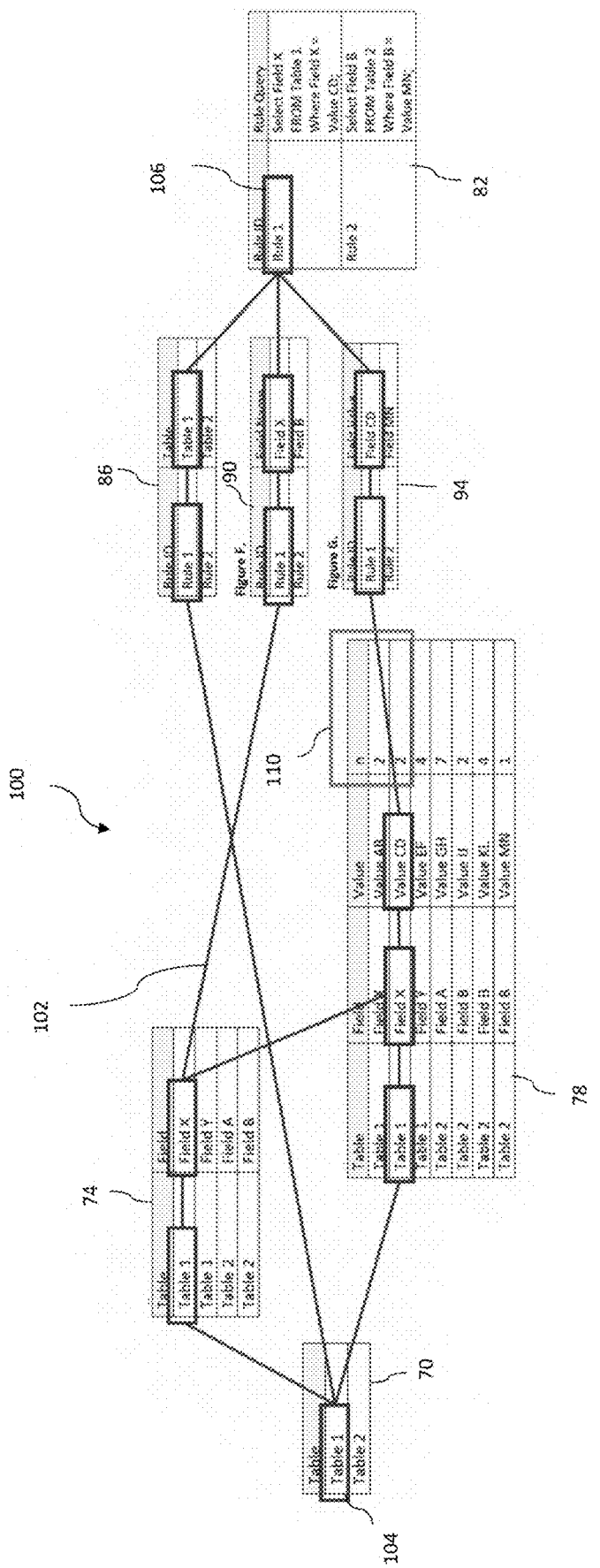
FIG. 5 is an example illustration of the lineage of the log data to the security alerts present within the tables of FIGS. 4A-4G.

Once the queries are generated by the query unit 28 and the data table results are generated by the graphing unit 20, the data lineage determination unit 26 can process the graph data 22 to determine the data lineage of a selected input log data to alerts based on the table results in the graph data 22. For example, the tables generated by the graphing unit 20 and illustrated in FIGS. 4A-4H provide the necessary graph input data that is processed by the data lineage determination unit 26 to establish the "nodes" and "edges" to trace or determine the lineage between input source table (e.g., log data source) at the source and the alerts or alert rules at the output. For example, the data lineage determination unit 26 can determine the data lineage based on the tables and fields used by the alert rules, the data tables, the identified fields, and the values used by the alert rules. An illustrative example of the data lineage, shown for simplicity purposes in a relational database format but analogous to graph connections used in the lineage graph, is illustrated in FIG. 5. The illustrated data lineage graph 100 illustrate the data connections or lineage 102 determined or identified by the data lineage determination unit 26 between the source or input log data 104 in data table 70 and the alerts or alert rules 106 in the data table 82 via intermediate connections with fields and associated values. The illustrated intermediate data table 78 can also include a column 110 that sets forth a sum of all values associated with the tables and fields. In the illustrated example, where Table=Table 1 and Field=Field X, the summed value for example is 4, since there are two rows that meet that criterion, and both rows have an "n" value of 2. The number n=4 represents the total number of logs in Table 1 since the sum of "n" per any given field within Table 1 will give the same number. It is clear from the data table 78 that the logs where value=value CD accounts for half of the total logs in Table 1, since n=2 for that row/value and n=4 for the corresponding Table. Therefore, logs with value=value CD account for 50% of the logs within Table 1.

Figure 6A:
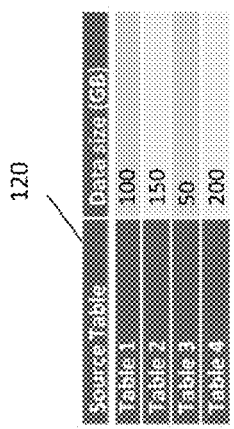
FIGS. 6A-6B illustrate data tables showing the costs associated with selected log data sources employed by the cost estimation unit of the present invention to determine a cost associated with log source per data source.
Figure 6B:
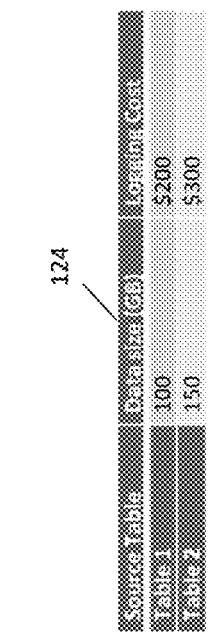

The security event management system 10 of the present invention can also be employed to determine a cost associated with enabling, monitoring, or processing selected types of security data, such as incidents and alerts, as shown for example in FIGS. 6A and 6B. As shown in FIG. 6A, the query unit 28 can query the normalized security data stored in the graphing unit 20 to determine the total data volume associated with different types of security data, such as for example log data per data source over a selected period of time. The graphing unit 20 can thus retrieve the relevant data and provide the data in a table format, such as illustrated in data table 120. The illustrated data table 120 includes selected log data sources that are associated with selected security data sources (e.g., table 1, table 2, and table 3) that have selected storage sizes, for example in gigabytes (GBs). The tabulated information via data table 120 is then conveyed to the cost estimation unit 24 as part of the graph data 22 that can determine or calculate any associated logging cost, that is, the cost to ingest and store or retain the log data based on cost data, such as prestored cost data or a third-party vendor's pricing data. The cost or pricing data can be pre-stored or can be provided to the system by one or more third party data sources, such as for example by cloud hosting companies. From the cost data and the graph data 22, the cost estimation unit 24 can determine or calculate the cost to ingest and store the security data, such as the log data, for a given time period. Further, the cost estimation unit 24 can calculate the logging cost per log source at any desired level of granularity (e.g., source system, source table, source event type, total SIEM system, and the like). As shown in FIG. 6B, the cost estimation unit 24 can generate the data table 124 that provides information associated with the log data sources and associated logging costs. In the current example, the cost is $2 per gigabyte. Those of ordinary skill in the art will readily recognize that the cost estimation unit 24

The cost estimation unit 24 can also be configured to calculate a selected value or cost for one or more types of security data, such as for example the selected value or cost per alert rule (e.g., alert rule value), as shown for example in FIGS. 7A-7E. In this regard, the query unit 28 can query the normalized graph data in the graphing unit 20 to retrieve selected security related incident data. Specifically, the retrieved incident data can include a count of closed/resolved alerts by resolution code per alert rule ID/name. As shown in FIG. 7A, the retrieved alert data can be in table form 130 and can include information associated with resolution codes, such as true positives and false positives. The data table 130 can be conveyed to the cost estimation unit 24 by the graphing unit 20 as part of the graph data 22, per the query unit 28, to determine or calculate a frequency of incidents and/or their resolutions (e.g., false or true incidents or resolutions), which can be determined by summing together all alert closure code counts per alert rule or based on how often the alert rule is triggered. As shown in FIG. 7B, the calculated frequency information can be added to the table 130 to form the data table 134.

Further, the cost estimation unit 24 can process the information in the data table 134 to determine or calculate an incident or alert fidelity (e.g., the percentage of alerts per rule that have a "True Positive" (or equivalent) closure code), otherwise known as a True Positive Rate. For example, if the number of True Positive alerts is 40 with a frequency of 100 overall alerts, then the fidelity or true positive rate is 40%. As shown for example in FIG. 7C, the fidelity information can be added to the data table 134 by the cost estimation unit 24 to form an updated data table 138.

The cost estimation unit 24 can then determine or assign an impact value per alert rule. The impact value denotes the estimated cost/penalty of the impact of the threat related to the alert rule. This can be defined per alert rule or per another security data related variable, such as for example severity (i.e., low, medium, high severity), where each level of severity is assigned a different value, such as a monetary value. The categorical variables can be ordinal encoded in lieu of having fiat amounts represent a like-continuous variable for calculation purposes. As shown for example in FIG. 7D, the impact value can be predetermined or entered for each alert rule in the data table 138 to form updated data table 142. The cost estimation unit 24 can then calculate an alert rule value for each alert rule in the table 142 using the following equation:

$$\text{Frequency} * \text{Fidelity} * \text{Impact Value} = \text{Alert Rule Value} \qquad \text{Equ 1}$$

In the current example, if the frequency is 100, the fidelity rate is 40%, and the impact value is $100, then the alert rule value is $4,000. A shown for example in FIG. 7E, the table 142 can be updated to include alter rule value to form updated table 146.

The security event management system 10 can further determine or calculate, based on the logging cost data (table 124, FIG. 6B) and the alert rule value data (table 146, FIG. 7E), a return on investment (ROI) per data source (e.g., log data source) after determining the connections or lineage of the values by the data lineage determination unit 26. The resulting ROI value can be calculated by determining the difference between the two following values:

$$\text{Alert Value} - \text{Logging Cost} = \text{ROI} \qquad \text{Equ 2}$$

Figure 8A:
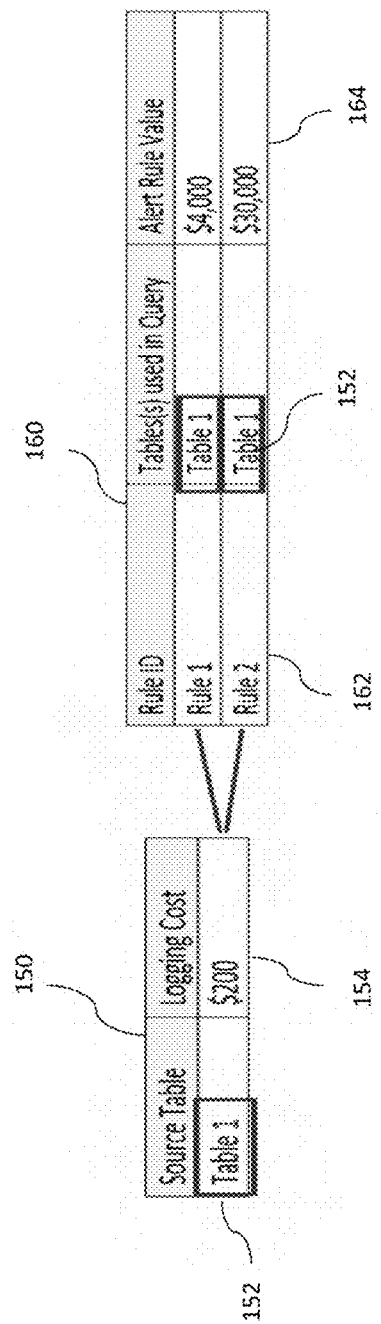
FIGS. 8A and 8B are data tables employed by the cost estimation unit of the present invention for determining a return on investment associated with each log data source.

According to an illustrative example, as shown in FIG. 8A, the log data stored in the graphing unit 20 can be formatted in a table 150 and can include an identification of a log data source 152, such as Table 1. The log source data 152 is mapped by the graphing unit 20 to the same log data source in the table 160, which is used in multiple alert rules 162, such as Rules 1 and Rules 2. Additionally, table 150 includes logging cost data 154 and table 160 includes alert rule value data 164 for both alert rules 162. The cost estimation unit 24 can employ Equ 2 to calculate the cost associated with each alert rule and any associated return on investment (ROI). In the current example, the logging cost is $200 and the total alert rule value associated with Table 1 is $34,000, and thus the ROI is $33,800. The same calculation can also be performed by the cost estimation unit 24 at a field value granularity level from each data source since the system can determine the percentage or proportion that each source table uses a particular field value.

Figure 8B:
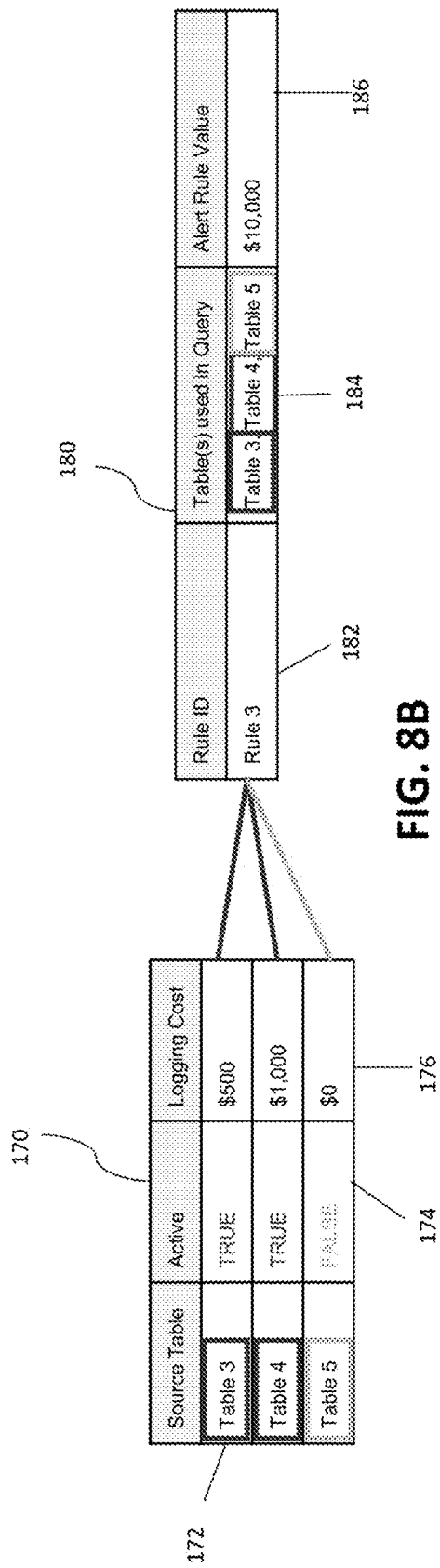

According to another example, as shown in FIG. 8B, the log source data stored in the graphing unit 20 can be formatted in a table 180 and can include an identification of one or more log data sources 182, such as Tables 3, 4 and 5. A rule query can use or reference more than one table. If the rule query references more than one table, then the alert rule value associated with that alert rule can be distributed, when performing the ROI calculation for each table, among the identified tables. Additionally, the alert rule value can be split among the tables that are on or active, since there are scenarios where a table reference may be present in the query and the table object exists in the database, but the table is not actively being used or populated with log data, and thus is not costing anything. As such, the graphing unit 20 can store metadata about the status (e.g., active or inactive) of each field or object in the data table, and the cost value associated with each alert rule can be distributed, according to any desired methodology, among the active tables. Alternatively, the cost value per alert rule can be distributed according to a proportion of log volume or count from each active data source or distributed according to the proportion of logs from each active source that actually triggers alerts from the alert rule.

The log data sources 172 can be mapped by the graphing unit 20 to an indication of the status 174 of the log data sources, as shown in table 170. The cost estimation unit 24 can calculate the cost 176 associated with each logging incident. The log source data 172 is then mapped by the graphing unit 20 to one or more alert rules 182, as shown in table 180. The table 180 can also set forth the tables 184 that are used in the query and any alert rule value associated therewith. In the current example, the alert rule 3 has a value or cost of $10,000, and only two of the three referenced tables are active. Therefore, for the ROI calculation of each active table, the cost estimation unit 24 can divide the value (e.g., $10,000) by the number of active tables (e.g., two), and assign the resulting value to each active table. Thus, the cost estimation unit 24 can assign $5,000 in alert rule value to each table. The ROI can be determined subtracting the logging cost from the alert value. As shown, if the logging cost is $200 and the total alert rule value associated with Table 1 is $34,000, the ROI is $33,800. The same calculation can also be performed by the cost estimation unit 24 at a field value granularity level from each data source since the cost estimation unit 24 can determine the percentage or proportion that each source table uses a particular field value. Therefore, the ROI of Table 3 can be $4,500 ($5,000-$500) and the ROI of Table 4 can be $4,000 ($5,000-$1,000). The ROI of Table 5 is not attributed any value since it is not active and not subject to logging costs.

The cost estimation unit 24 of the present invention can also employ one or more forecasting techniques for forecasting the ingestion of security data based on the historical and current ingestion of security data. The graphing unit 20 can store the security data in any selected format, such as in structured format as a table or as a time series model. The cost estimation unit 24 can apply, according to one embodiment, an exponential smoothing algorithm to forecast the future ingestion of security data, and then determine or calculate a current average ingestion volume (CATV) and a forecasted average ingestion volume (FAIV), where each value is calculated using the mean average of their respective data sets, per representative time series period. CATV is the mean average of historical data points over a selected time period, and FAIV is the mean average of forecasted data points over a selected time period.

The cost estimation unit 24 can have prestored therein or can receive from a third-party data source the SIEM vendor costs associated with storing and ingesting various amounts of data. The SIEM vendors can provide pricing plan data which are determined by anticipated ingestion volume. The cost estimation unit, based on the volume of incoming data and the forecasted future data ingestion requirement, can select a pricing plan that is the lowest or is optimal based on the current and/or forecasted data volumes. The cost estimation unit can be configured to simulate the costs of a selected plan against the other stored plans, and then the comparison results, the cost estimation unit selects the lowest-cost plan.

The invention claimed is:

1. A computer-implemented network security monitoring system, comprising
    a hardware processor; and
    a non-transitory computer-readable storage medium storing instructions, which, when executed by the hardware processor, are configured to implement:
        an extraction unit for extracting security data from a plurality of data sources to form extracted security data, wherein the security data includes log data, event data, and alert rules data,
        a graphing unit for mapping the extracted security data to at least one or more data fields and data models to form graph data,
        a data lineage determination unit for determining a data lineage between the log data and one or more of the alerts based on the graph data,
        a query unit for communicating with the graphing unit such that at least one system query is generated and for querying the graph data generated by the graphing unit, and
        a cost estimation unit for determining a cost value associated with one or more types of the security data based on one or more selected types of cost data and the graph data.

2. The computer-implemented system of claim 1, wherein the cost estimation unit determines the cost value associated with monitoring the alert data.

3. The computer-implemented system of claim 1, wherein the data lineage determination unit is configured to map the log data to the event data, and then to map the event data to one or data fields.

4. The computer-implemented system of claim 1, wherein the data lineage determination unit is configured to map the one or more data fields to one or more data models.

5. The computer-implemented system of claim 4, wherein the data lineage determination unit is further configured to map the one or more data models to one or more alert rules, and then to map the one or more alert rules to one or more alerts.

6. The computer-implemented system of claim 5, wherein the cost estimation unit is configured to determine a selected cost value of the alert rule.

7. The computer-implemented system of claim 6, wherein the cost estimation unit is configured to determine a selected cost value associated with each of the sources of the log data.

8. The computer-implemented system of claim 5, wherein the graph data includes three or more of:
    a first data table identifying a first plurality of tables, a second data table associating a plurality of data fields with the first plurality of tables from the first data table, a third data table correlating the first plurality of tables and the plurality of data fields with a plurality of data field values associated with each of the plurality of data fields, a fourth table that lists a plurality of alert rules with a plurality of query results or a plurality of functions, a fifth table that correlates the plurality of alert rules with the first plurality of tables, a sixth table that correlates the plurality of alert rules with the plurality of data fields, a seventh table that correlates the plurality of alert rules with the plurality of data field values, and an eight table that correlates the plurality of query results with the plurality of functions.

9. The computer-implemented system of claim 8, wherein the first plurality of tables represents a location of the log data.

10. The computer-implemented system of claim 9, wherein the third table includes a summary of count (n) per field values associated with the plurality of data field values.

11. The computer-implemented system of claim 1, wherein the graph data comprises a first data table identifying a first plurality of tables, a second data table associating a plurality of data fields with the first plurality of tables from the first data table, a third data table correlating the first plurality of tables from the first data table and the plurality of data fields from the second table data with a plurality of data field values associated with each of the plurality of data fields, a fourth table that lists a plurality of alert rules with a plurality of query results or a plurality of functions, and a fifth table that correlates the plurality of alert rules with the first plurality of tables, wherein the data lineage determination unit determines a lineage between one or more of the first plurality of tables and one or more of the plurality of alert rules from the graph data.

12. The computer-implemented system of claim 1, wherein the graph data includes a data table having selected alert rules associated therewith, wherein the cost estimation unit is configured to determine a frequency of one or more alerts based on the alert rules and to update the data table to include the frequency of the alerts and to determine the cost value associated with the alerts.

13. The computer-implemented system of claim 12, wherein the cost estimation unit determines an impact value for one or more of the alert rules.

14. A computer-implemented method for determining a data lineage, comprising receiving security data from a plurality of data sources, wherein the security data includes log data, event data, alert data, and alert rules data, extracting the security data from the plurality of data sources with an extraction unit to form extracted security data, mapping the extracted security data to at least one or more data fields and data models with a graphing unit to form graph data, determining a data lineage between the log data and one or more of the alerts based on the graph data with a data lineage determination unit, communicating with the graphing unit via a query unit such that at least one system query can be generated and for querying the graph data generated by the graphing unit, and determining a cost value associated with one or more types of the security data with a cost estimation unit based on one or more selected types of cost data and the graph data.

15. The computer-implemented method of claim 14, further comprising determining the cost value associated with monitoring the alert data with the cost estimation unit.

16. The computer-implemented method of claim 14, further comprising mapping the log data to the event data and the event data to one or more data fields with the data lineage determination unit.

17. The computer-implemented method of claim 14, further comprising mapping the one or more data fields to one or more data models with the data lineage determination unit.

18. The computer-implemented method of claim 17, further comprising mapping the one or more data models to one or more alert rules and then mapping the one or more alert rules to one or more alerts with the data lineage determination unit.

19. The computer-implemented method of claim 18, further comprising determining a selected cost value of the alert rule with the cost estimation unit.

20. The computer-implemented method of claim 19, further comprising determining a selected cost value associated with each of the sources of the log data with the cost estimation unit.

21. The computer-implemented method of claim 18, wherein the graph data includes three or more of:

a first data table identifying a first plurality of tables, a second data table associating a plurality of data fields with the first plurality of tables from the first data table, a third data table correlating the first plurality of tables and the plurality of data fields with a plurality of data field values associated with each of the plurality of data fields, a fourth table that lists a plurality of alert rules with a plurality of query results or a plurality of functions, a fifth table that correlates the plurality of alert rules with the first plurality of tables, a sixth table that correlates the plurality of alert rules with the plurality of data fields, a seventh table that correlates the plurality of alert rules with the plurality of data field values, and an eight table that correlates the plurality of query results with the plurality of functions.

22. The computer-implemented method of claim 21, wherein the first plurality of tables represents a location of the log data.

23. The computer-implemented method of claim 22, wherein the third table includes a summary of count (n) per field values associated with the plurality of data field values.

24. The computer-implemented method of claim 14, wherein the graph data comprises a first data table identifying a first plurality of tables, a second data table associating a plurality of data fields with the first plurality of tables from the first data table, a third data table correlating the first plurality of tables from the first data table and the plurality of data fields from the second table data with a plurality of data field values associated with each of the plurality of data fields, a fourth table that lists a plurality of alert rules with a plurality of query results or a plurality of functions, and a fifth table that correlates the plurality of alert rules with the first plurality of tables, wherein the data lineage determination unit determines a lineage between one or more of the first plurality of tables and one or more of the plurality of alert rules from the graph data.

25. The computer-implemented method of claim 14, wherein the graph data includes a data table having selected alert rules associated therewith, wherein the cost estimation unit is configured to determine a frequency of one or more alerts based on the alert rules and to update the data table to include the frequency of the alerts and to determine the cost value associated with the alerts.

26. The computer-implemented method of claim 25, wherein the cost estimation unit determines an impact value for one or more of the alert rules.

* * * * *